United States Patent [19]

Moncrieff

[11] Patent Number: 5,606,486
[45] Date of Patent: Feb. 25, 1997

[54] CAPACITOR EMPLOYING PLURAL MATERIALS FOR DIELECTRIC

[76] Inventor: J. Peter Moncrieff, 408 Mason Rd., Vista, Calif. 92084

[21] Appl. No.: 441,526

[22] Filed: May 15, 1995

[51] Int. Cl.$^6$ .............................. H01G 4/018; H01G 4/20
[52] U.S. Cl. ..................... 361/312; 361/326; 361/323; 361/311; 361/314; 29/25.42
[58] Field of Search .................. 361/321.1, 321.2, 361/313, 312, 323, 326, 305, 311, 314; 29/25.42

[56] References Cited

U.S. PATENT DOCUMENTS 4,173,033  10/1979  Sako et al. .......................... 361/323
4,353,107  10/1982  Decroix et al. ...................... 361/323

*Primary Examiner*—Leo P. Picard
*Assistant Examiner*—Anthony Dinkins

[57] ABSTRACT

A capacitor employing plural dielectric materials between oppositely facing, distinctly electrically connected plates, or employing interspersed plural dielectric materials outside the space between oppositely facing, distinctly electrically connected plates, wherein one material is a plastic and a second material is a plastic, gas, or vacuum. A method for ameliorating the frequency dependent variation pattern in dielectric behavior, of a single material employed as a dielectric in a capacitor, by employing a plurality of materials between oppositely facing, distinctly electrically connected plates, and/or by employing an interspersed plurality of materials outside the space between oppositely facing, distinctly electrically connected plates.

8 Claims, 3 Drawing Sheets

CAPACITOR EMPLOYING PLURAL MATERIALS FOR DIELECTRIC

FIELD OF INVENTION

This invention pertains to capacitor dielectrics and the materials of which they are composed.

BACKGROUND OF THE INVENTION

Physical materials generally change when they are subjected to an electric field, including electrostatic fields and those fields associated with electromagnetic waves. For example, an electric field can cause charge displacement within a material, thereby polarizing that material; the atoms or molecules of that material could be made to acquire induced dipole moments, and any molecules with permanent dipole moments could be realigned.

If an imposed electric field changes, the material will generally change, so as to track the change in the electric field to which it is subjected. For example, the charge displacement within a material will change in response to changes in an imposed electric field. Likewise, if an imposed magnetic field changes, the charge displacement within a material could change in response.

Thus, a material generally changes in the presence of an electric field, compared to the absence of an electric field, and it also changes when the nature of the imposed electric field changes.

In turn, an electric field is generally affected by the presence of a material as opposed to the absence of that material. Furthermore, when electrically significant change (for example charge displacement) occurs in that material, then the electric field is generally affected by that change in the material. The affected electric fields could include electrostatic fields and those fields associated with electromagnetic waves.

The change in the material generally lags temporally behind the change in the electric field. For example, the polarizing charge displacements in a material can move only at a finite speed, and cannot keep up with rapid changes in the imposed electric field.

The amount of temporal lag varies for different materials. For example, molecules with differing molecular weights, molecular shapes, and/or differing dipole moments, in materials at differing viscosities, (implying differing molecular arrangements) could respond with differing speeds and differing temporal lags to changes in the electric field.

There are several types of changes that can happen to a material in response to an imposed electric field, and several mechanisms that can produce such changes. For example, some types of polarization changes that can be caused in a material by an electric field are: electronic polarization, due to displacement of electronic charges; ionic polarization, due to displacement of ions; dipole polarization, due to reorientation of permanent dipoles; induced dipole moment polarization, due to distortion of the natural electrical distribution within a molecule or atom, even where such molecules are not permanent dipoles; and polarization by space charges, due to macroscopic displacement.

Each of these several types of changes involves a different mechanism, and thus a different type of temporal lag in the response of one given material. For example, it is known that space charge polarization could affect a material's dielectric constant most significantly at low frequencies of electric field change (power to audio); dipole polarization could affect a material most significantly at somewhat higher frequencies (audio to RF); ionic polarization could affect a material most significantly at yet higher frequencies (infrared to UV); and electronic polarization could affect a material most significantly at yet higher frequencies (UV to X-rays).

Since each of these mechanisms is frequency sensitive, and since different mechanisms become predominant at different frequencies, the response of any one material to an imposed changing electric field can vary significantly as a function of frequency. For example, the curve of the dielectric constant of a typical dielectric material varies dramatically as a function of frequency, due to the different polarization mechanisms becoming active, inactive, or even resonating at different frequencies. This dramatic variation in dielectric constant curve for a single material looks like a group of bandpass and resonant filters imposed on a frequency response curve, giving it a complex shape, which represents a signature pattern for that one material. The behavior of this material as a dielectric depends on its dielectric constant. Because the dielectric constant has a complex signature pattern as a function of frequency, this material will behave differently as a dielectric for different frequencies, in a complex signature pattern. Because time is simply the inverse of frequency, this material will also have a complex signature pattern of temporal behavior.

Thus, each material will generally have a signature pattern of response, in both the frequency and time domains, to an imposed changing electric field.

The temporal lag by the material in turn affects the electric field, altering the electric field. This alteration of the electric field, by a material subjected to that field, can have adverse consequences for some applications. For example, if a changing electric field represents a signal, then a temporally lagging change of that field by a material could corrupt that signal.

Furthermore, in those frequency regions where a material's response changes significantly as a function of frequency, this corrupting effect upon an electric field can be dispersive.

The signature pattern of temporally lagging response from each different material in turn can affect the electric field in a signature pattern manner, perhaps corrupting the electric field in a signature pattern. Thus, for example, one could examine the pattern of corruption of a signal represented by an electrical field, and, from the signature nature of this pattern of signal corruption, one might be able to ascertain precisely what material this electric field was imposed upon and in turn affected by.

If the material is employed as a dielectric in a capacitor, and if the electric field is an electrostatic field or a field associated with an electromagnetic wave, then the dielectric material can corrupt an electrical current, voltage, or signal being processed by the capacitor, and can do so in a signature pattern of corruption.

The signature pattern of corrupting temporal lags, from a dielectric material in a capacitor, could affect one frequency of change of the electric field differently than it affects another frequency. Thus, such a signature pattern of corruption would be especially damaging to a current, voltage, or signal that contained more than a single frequency. Any current, voltage, or signal that contains transients or more than one frequency could have its different frequencies corrupted to different extents by the signature pattern of corrupting temporal lags from the capacitor's dielectric. Thus, the signature pattern of corruption from the particular material of the dielectric could be especially noticeable and problematic on a current, voltage, or signal that contains more than one frequency, particularly where the differing plural frequencies span a range such that they are treated differently by the material's signature pattern. One such example is a current, voltage, or signal representing audio information, which often contains many frequencies at once, spanning several logarithmic decades, and where any foreign signature pattern of corruption is especially noticeable and problematic.

One material's signature pattern of corruption upon an electric field could be regarded as being similar to a small group of bandpass and resonant and anti-resonant filters, emphasizing some frequencies and suppressing other frequencies. One material generally might emphasize only a narrow band of frequencies, and suppress only a narrow band of frequencies. Thus, one material generally might have a strong coloration or personality that it imposes upon a signal represented by an electric field.

A second, different material could have a different signature pattern, similar to a different group of bandpass and resonant and anti-resonant filters operating at different frequencies from the first material.

When working with filters, it can sometimes be advantageous to spread out a single high Q resonance to become a low Q resonance over a wider span of frequencies, or a plurality of resonances covering a wider span of frequencies. The lower Q resonance or plurality of resonances affecting more frequencies imposes less coloration upon a signal than a high Q resonance affecting fewer frequencies. Indeed, in the limit, an infinite number of filter resonances affecting all frequencies could restore substantially flat response, resulting in substantially no coloration.

Likewise, when working with signature patterns of frequency emphasis and suppression by materials in an electric field, many resonances at many different frequencies could be advantageous over few resonances at few frequencies, by providing a less strongly colored signature pattern.

Thus, if a second different material has a signature pattern significantly different from a first material, then the combination of these two materials might provide less coloration of a signal than one material alone could provide.

Furthermore, the second material might be selected to be one having a signature pattern substantially complementary to the signature pattern of the first material in some aspects. For example, some of the frequencies emphasized by the first material could be suppressed by the second material. In such a case, the combination of these two materials might provide less coloration of a signal than one material alone could provide.

In addition, it could be further advantageous for the two different materials to be interspersed in some manner. If two materials are employed, but the first material is exclusively more proximate to a conductor (e.g. a capacitor plate) than the second material, then the signature pattern coloration of the first material might predominate, especially at certain high frequencies where the thickness of the more proximate first material could effectively place the more distant second material out of range. This could be disadvantageous in some applications. This problem could be solved by interspersing the two materials in some manner.

DESCRIPTION OF PRIOR ART

Prior art has extensively employed a solid such as plastic as a material for the dielectric separating oppositely facing plate pairs in a capacitor. The choice among solid materials has been determined by considerations of cost, volumetric efficiency, and some aspects of electrical performance.

Each solid material has its own strong signature pattern of corrupting a changing electric field in which it is immersed, such as the electrostatic field between oppositely facing plate pairs of a capacitor, and/or the electromagnetic fields of charge propagation along the plates of a capacitor. This strong signature pattern of corruption becomes evident in the performance of a capacitor handling a current, voltage, or signal, especially where that current, voltage, or signal contains more than one frequency. This strong coloration by the dielectric material's signature pattern is detrimental to the electrical performance of the capacitor. An ideal capacitor should be able to handle a current, voltage, or signal without imposing any signature pattern. Thus, the electrical performance of a capacitor can be improved if a strong coloration by a signature pattern can be ameliorated. One technique for ameliorating the coloration from a strong signature pattern could be to introduce other signature patterns that differ from the first, and perhaps are complementary to the first in some aspects. This could be accomplished by deliberately employing, for a dielectric between facing plates in a capacitor, not one material but two or more materials. The plural materials could be specifically selected for their differing signature patterns in response to a changing electric field.

However, prior art has generally employed only a single material for a solid dielectric between oppositely facing plate pairs in a capacitor. This has been especially true for plastic film materials, where a single plastic material has been used as the dielectric between oppositely facing plate pairs. No prior art capacitors have employed plural plastic materials between oppositely facing, distinctly electrically connected plates, and none have employed plural materials where the first material is a plastic and the second is a gas or void. Prior art capacitors employing plural materials as a dielectric have been limited to different combinations of materials. Moreover, their purpose and function for employing plural materials has been entirely irrelevant to the teachings of the present invention. For example, in some prior art capacitors a liquid such as oil has been used to impregnate a solid dielectric, for the express purpose of achieving a higher breakdown voltage, without consideration of the differing signature patterns of the liquid and solid in response to a changing electric field.

Thus, use of only a single solid material as a dielectric between oppositely facing plate pairs has been a limitation of prior art capacitors, especially in the use of only a single plastic material. This limitation of prior art has produced the disadvantageous consequence that prior art capacitors corrupt an electric current, voltage, or signal with a strong signature pattern of coloration.

Sako (4,173,033) shows a single capacitor dielectric material, comprising a single molecule type, this new single long chain molecule having been formed via a polymerization process from two historically antecedent types of molecules. This single material comprising a single type of molecule has the disadvantage of corrupting an electric field with a strong single signature pattern of coloration. Decroix (4,353,107) shows a single capacitor dielectric material, comprising an intimate admixture of two polymers, made intimate and homogeneous under conditions of high heat and thorough agitation. Even though this polymer blend material contains two types of molecules, the two type molecules are necessarily limited to being intimately, thoroughly, and homogeneously intermingled—such that there are not two distinct materials substantially separately congregated at distinct locations within Decroix' dielectric. Decroix' material requires substantially a single molecular arrangement, a single type of intermolecular interaction, a single type of functional group, and a single relaxation time, uniformly distributed throughout his dielectric. The art regards these four factors as principal determinants of the temporal lag of a polymer's response to an electric field. Thus, Decroix' dielectric behaves substantially as a single material with respect to the temporal lag signature phenomena taught by the present invention, and has the disadvantage of corrupting an electric field with a strong single signature pattern of coloration.

Capacitors also employ a dielectric outside their plate array, or outside the space between oppositely facing plate pairs.

Prior art has attached great significance to the dielectric that is situated between oppositely facing pairs of plates. It has been recognized that this dielectric affects the performance of the capacitor, because the displacement current and electrical charge/discharge occurs through this dielectric.

But prior art has not attached great significance to any dielectrics that are situated outside the space between oppositely facing pairs of plates. Prior art has operated under the theory and belief that all of the displacement current and electrical charge/discharge between facing pairs of plates occurs only through the dielectric that is situated between facing pairs of plates, and that therefore any dielectric situated outside this space cannot substantially affect the electrical performance of a capacitor.

However, it has now been experimentally determined and demonstrated that a dielectric, situated outside the space between oppositely facing pairs of plate surface areas, does substantially affect the electrical performance of a capacitor, and that the electrical performance of a capacitor can be improved when the overall quality of the dielectric outside the space between oppositely facing pairs of plates is improved over prior art. This is further explained in another patent by the inventor.

Prior art has sometimes accidentally used two different materials for the dielectrics outside the whole plate array of a capacitor, as a protective and/or decorative wrap or case. For example, during the manufacturing process a wound polypropylene film capacitor section might be provided with about 10 turns of plain clear polypropylene as a wrap to seal, hold, and protect the raw wound section during curing and spraying; then the capacitor might be finished with at least 3 turns of a thick polyester adhesive tape as a protective and decorative outer wrap. As another example, a plastic film capacitor might be potted in an epoxy resin, which in turn might be encased within an outer box made of some rigid material. But in all such cases where prior art has accidentally used two different materials for dielectrics outside the capacitor plate array, prior art has not interspersed these materials in any manner. Prior art has placed one first material exclusively closer to the capacitor plate array than the other second material. Thus, the signature pattern coloration of the first material has predominated, especially at high frequencies where the thickness of the more proximate first material could effectively place the more distant second material out of range. This could be disadvantageous in some applications.

OBJECTS AND ADVANTAGES

Accordingly, it is an object of the present invention to provide a capacitor wherein the dielectric or dielectrics between oppositely facing plate pairs comprise a plurality of distinct materials. When the two or more materials are appropriately selected to have differing or complementary signature patterns, improved capacitor performance can be provided, whereby the signature pattern by which the capacitor dielectric corrupts a current, voltage, or signal is ameliorated, compared to a prior art capacitor employing only a single material as a dielectric.

A further object of the present invention is to provide a capacitor where a first one of the plurality of materials is a plastic.

A further object of the present invention is to provide a capacitor where a second one of the plurality of materials is a plastic, or a gas, or a void.

A further object of the present invention is to provide a capacitor where the distinct dielectric materials are disposed between different paired sets of oppositely facing plates among the plurality of oppositely facing plate pairs in the capacitor.

A further object of the present invention is to provide a capacitor where the distinct dielectric materials are disposed between the same paired set of oppositely facing plates.

A further object of the present invention is to provide a capacitor where the distinct dielectric materials are disposed in separate volumetric spaces between oppositely facing plate pairs, or are interspersed in the same volumetric space between oppositely facing plate pairs.

A further object of the present invention is to provide a capacitor where the distinct dielectric materials take the form of distinct molecule types or distinct molecular arrangements.

A further object of the present invention is to provide a capacitor where the dielectric or dielectrics outside the space between oppositely facing plate pairs comprise a plurality of distinct materials which are interspersed in some manner.

A further object of the present invention is to provide a method for ameliorating the frequency dependent variation pattern in dielectric behavior, of a single material employed as a dielectric in a capacitor, by employing a plurality of materials between oppositely facing, distinctly electrically connected plates, and/or by employing an interspersed plurality of materials outside the space between oppositely facing, distinctly electrically connected plates. Further objects and advantages of the present invention will become apparent from a consideration of the drawings and ensuing description of preferred embodiments.

DESCRIPTION OF PREFERRED EMBODIMENTS

Figure 1A:
FIG. 1a shows a basic capacitor constructed in accordance with prior art, in elevation view.

FIG. 1a shows, in elevation view, a basic capacitor constructed in accordance with prior art. All elevation views show a capacitor as seen from an edge of the electrode plates. A first electrode plate 1a is disposed so that its surface is substantially oppositely facing with a second electrode plate 2a. Oppositely facing plates 1a and 2a are distinctly electrically connected, plate 1a being connected to a terminal 13 and plate 2a being connected to a terminal 14. The two oppositely facing plates 1a and 2a constitute an oppositely facing plate pair. They are separated from each other by an instance of a dielectric 3. In prior art capacitors, dielectric 3 has been composed of a single material.

A basic capacitor could be said to comprise a pair of oppositely facing plates, distinctly electrically connected, and separated by a dielectric. Thus, plates 1a and 2a and dielectric 3, as shown in FIG. 1a, could be said to constitute a basic capacitor.

It is noted that some prior art capacitors structure plate 1a so that it has twin surfaces, for the express purpose of decreasing charge density in high current applications (and likewise for plate 2a). This one plate with twin surfaces has had a dielectric core, and in some prior art capacitors the material of this dielectric core has been different than the material of the dielectric separating plate 1a from plate 2a. But prior art has regarded these twin surfaces of plate 1a as being one plate, not two, and thus the dielectric core material does not count as a dielectric separating two distinct plates of the capacitor. No displacement current between plates flows through this dielectric core, and this dielectric core does not functionally contribute to the capacitance of the capacitor. Furthermore, the twin surfaces of this one plate are electrically connected in common, and so are not distinctly electrically connected; in contrast, the present invention specifies that the dielectrics to be considered must separate oppositely facing plates that are distinctly electrically connected.

The elements of a basic capacitor can be appropriately multiplied, to form a basic multiple plate capacitor. A basic multiple plate capacitor could be regarded as being equivalent to plural basic capacitors in parallel.

Figure 1B:
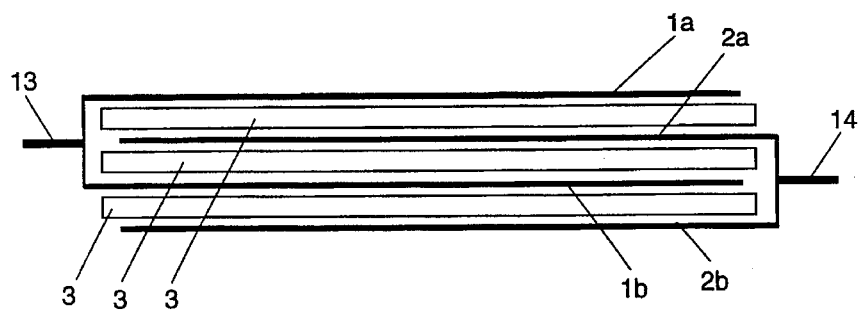
FIG. 1b shows a basic multiple plate capacitor constructed in accordance with prior art, in elevation view.

FIG. 1b shows, in elevation view, a basic multiple plate capacitor constructed in accordance with prior art. A plate 1b is electrically connected in common with plate 1a, both plates being connected to terminal 13. Likewise, a plate 2b is electrically connected in common with plate 2a, both plates being connected to terminal 14. Plates 1b and 2b are oppositely facing, just as plates 1a and 2a are. Plates 1b and 2b are distinctly electrically connected relative to one another, just as plates 1a and 2a are. Plates 1b and 2b are separated by an instance of dielectric 3, just as plates 1a and 2a are. In prior art capacitors, all instances of dielectric 3 have been composed of the same single material.

Furthermore, plate 2a is separated from plate 1b by an instance of dielectric 3. In prior art capacitors, such instances of dielectric 3 have also been composed of the same single material as the other instances of dielectric 3.

It is noted that plates 2a and 1b in FIG. 1b could also be said to be oppositely facing plates, distinctly electrically connected, and separated by a dielectric (though they are not a plate pair, each already being paired with another plate).

The single material, which has been employed by prior art capacitors for all instances of dielectric 3, imposes its own signature pattern of coloration or corruption upon a current, voltage, or signal being processed by the capacitor. Thus, the electrical performance of such prior art capacitors has been degraded by a strong coloration signature of the single material employed for all instances of dielectric 3 throughout the capacitor.

Figure 2A:
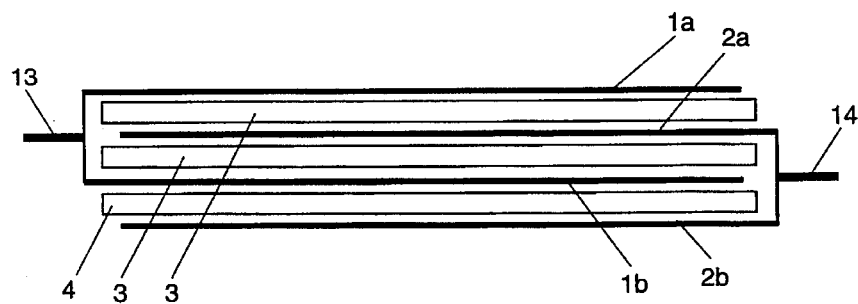
FIGS. 2a–2b show a capacitor in elevation view, illustrating possible embodiments of the present invention employing non-adjacent dielectrics comprising distinct materials.

It is understood that a multiple plate capacitor can have any plural number of plates, in sets of two or more plates per set, with each member plate of one set being distinctly electrically connected from other member plates of the same set, the various plates being appropriately separated from one another by instances of dielectric. FIGS. 1b–3c and 4d–4g illustrate merely one example of a multiple plate capacitor, containing two sets with two plates per set. FIG. 2a shows, in elevation view, one possible embodiment of a basic multiple plate capacitor constructed in accordance with the present invention. The structure shown in FIG. 2a is similar to the structure shown in FIG. 1b. The difference shown is that plates 1b and 2b are separated by a dielectric 4, which comprises a material different than the material that dielectric 3 comprises. This is contrary to prior art capacitors, as shown in FIG. 1b, where the same dielectric material separates all oppositely facing plate pairs that are distinctly electrically connected.

Thus, in FIG. 2a the dielectric separating plate 1b from plate 2b is different than the dielectric separating plate 1a from plate 2a. Each of these two dielectrics contributes to the capacitance of the capacitor. Each imposes its own signature pattern of coloration or corruption upon a current, voltage, or signal being processed by the capacitor. Thus, the degrading signature pattern imposed by each single dielectric material can be spread out and ameliorated by the other dielectric material. The combination of the two dielectric materials can wreak a less strong coloration than either single dielectric material alone would wreak, and thus the electrical performance of the capacitor can be improved, compared to prior art capacitors. This performance improvement could be particularly significant if the material for dielectric 4 is selected to have a significantly different signature pattern than the material of dielectric 3, especially a signature pattern with some complementary features.

Figure 2B:
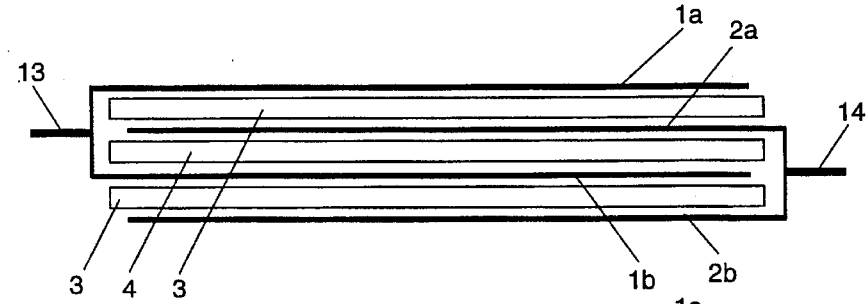

The dielectric separating plate 1b from plate 2a in FIG. 2a could be an instance of dielectric 3, as shown, comprising the same material as the instance of dielectric 3 separating plate 1a from plate 2a; alternatively, it could comprise the same material as dielectric 4, or it could comprise some third material, distinct from the material used for dielectric 3 or for dielectric 4. FIG. 2b shows, in elevation view, another possible embodiment of a basic multiple plate capacitor constructed in accordance with the present invention. The structure shown in FIG. 2b is similar to the structure shown in FIG. 2a. The difference shown is that plates 1b and 2a are separated by dielectric 4, comprising a material distinct from the material used for dielectric 3. Instances of dielectric 3 separate plate 1a from plate 2a, and separate plate 1b from plate 2b; these plural instances of dielectric 3 could comprise the same material as one another. The FIG. 2b structure is in accordance with the present invention because dielectric 4, separating two oppositely facing plates electrically distinctly connected (namely plates 1b and 2a), comprises a material distinct from the material which dielectric 3, separating two oppositely facing plates distinctly electrically connected, comprises.

In the FIG. 2a and 2b embodiments of the present invention, the plural distinct dielectric materials taught by the present invention are shown as being non-adjacent to one another. Dielectrics comprising distinct materials are employed to separate different pairs of oppositely facing, distinctly electrically connected plates.

It is also possible for the plural distinct dielectric materials taught by the present invention to be adjacent to one another. FIGS. 3a–3d show some possible embodiments featuring adjacent plural distinct dielectric materials.

Figure 3A:
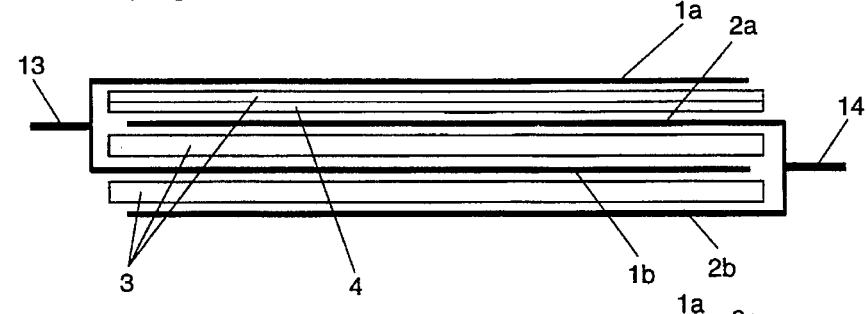
FIGS. 3a–3d show a capacitor in elevation view, illustrating possible embodiments of the present invention employing adjacent dielectrics comprising distinct materials.

FIG. 3a shows, in elevation view, another possible embodiment of a basic multiple plate capacitor constructed in accordance with the present invention. The structure shown in FIG. 3a is similar to the structure shown in FIG. 2a. The difference shown is that dielectric 3, comprising a first material, and dielectric 4, comprising a second distinct material, are adjacent to one another, between one pair of oppositely facing plates, e.g. plates 1a and 2a as shown in FIG. 3a. Thus, between at least one pair of oppositely facing plates in a capacitor, there are plural distinct dielectric materials.

In the FIG. 2a–2b embodiments as shown, it is possible to employ only one single material as a dielectric between any single pair of oppositely facing plates, since the second material specified by the present invention is employed as a dielectric between a second pair of oppositely facing plates. In the FIG. 3a–3d embodiments as shown, plural materials as specified by the present invention are employed as a dielectric between at least one single pair of oppositely facing plates. This is a sufficient condition to satisfy the requirements of the present invention, so in principle any dielectrics may be employed between any and all other pairs of oppositely facing plates in one capacitor.

Since both distinct materials contribute to the capacitance between plates 1a and 2a in FIG. 3a, this part of the capacitance of the capacitor could bear the signature pattern of the combination of the two materials. The signature pattern of this combination could be less colored than the signature pattern of one material alone, and thus provide improved capacitor performance over prior art.

For the combination dielectric between plates 1a and 2a in FIG. 3a, dielectric 3 is shown as being closer to plate 1a and dielectric 4 is shown as being closer to plate 2a. Alternatively, this could be reversed, so that dielectric 3 might be closer to plate 2a. In FIG. 3a, dielectric 3 and dielectric 4 between plates 1a and 2a are shown as equal size rectangular solids, lying atop one another. Alternatively, these two dielectrics each could have any shape, could be unequal in volume, could be fragmented into several volumes, could be arranged relative to each other in any pattern, etc. There could be more than two distinct materials employed between one set of oppositely facing plates, in accordance with the present invention.

The dielectrics separating plate 2a from plate 1b, and separating plate 1b from plate 2b, are shown in FIG. 3a as being instances of dielectric 3, comprising the same material as employed in dielectric 3 participating in the separation of plate 1a from plate 2a. But these dielectrics could each variously or all be instances of either dielectric 3 or dielectric 4, comprising the same material as employed in the instance of dielectric 3 or 4 separating plate 1a from plate 2a.

Alternatively, the dielectrics separating plate 2a from plate 1b, and separating plate 1b from plate 2b, could each variously or all be instances of dielectrics comprising materials distinct from the materials in the instance of dielectric 3 and dielectric 4 separating plate 1a from plate 2a.

Figure 3B:
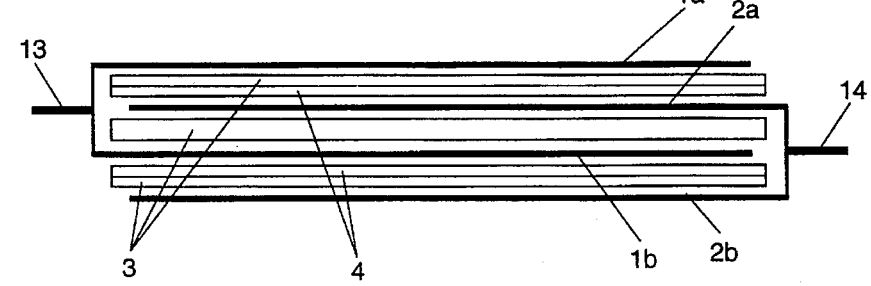

FIG. 3b shows, in elevation view, another possible embodiment of a basic multiple plate capacitor constructed in accordance with the present invention. The structure shown in FIG. 3b is similar to the structure shown in FIG. 3a. The difference shown is that dielectrics comprising plural distinct materials are employed between more than one pair or set of oppositely facing plates. FIG. 3a could be regarded as showing one possible sufficient condition for satisfying the requirements of the present invention. The configuration shown in FIG. 3b could provide even better performance than the FIG. 3a configuration, since the combination dielectrics are used between plural pairs of plates in one capacitor.

The combination sandwich or laminate of dielectric 3 and 4 could have the same orientation throughout the capacitor, or it could be occasionally inverted, randomly or in some pattern. FIG. 3b shows its orientation inverted between plates 1b and 2b, compared to its orientation between plates 1a and 2a. This could be advantageous in further spreading out or ameliorating the coloration of the signature patterns of the dielectric materials. For example, when plate 1a is charged positively, the positive charge would see the material of dielectric 3 more strongly than it sees the material of dielectric 4—but this could be balanced or offset by the fact that the simultaneous positive charge on plate 1b would see the material of dielectric 4 more strongly than it sees the material of dielectric 3.

Figure 3C:
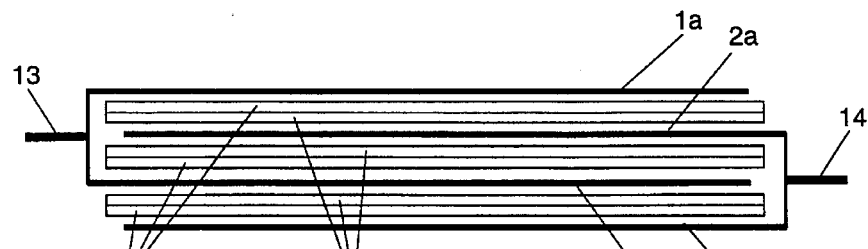

FIG. 3c shows that dielectrics comprising plural distinct materials could be employed between all plates of a capacitor, not just between oppositely facing plate pairs. For example, in the FIG. 3c embodiment, plural distinct materials are shown employed not only for the dielectric between plate pair 1a, 2a and plate pair 1b, 2b, but also for the dielectric between plates 2a and 1b.

Figure 3D:
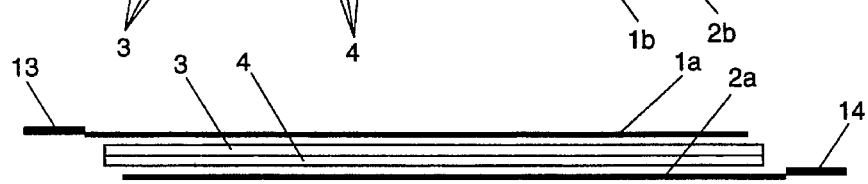

FIG. 3d shows, in elevation view, a possible embodiment of a basic capacitor constructed in accordance with the present invention. FIG. 3d shows that the present invention is applicable to a capacitor comprising just a single pair of oppositely facing plates. Dielectrics 3 and 4, comprising plural distinct materials, are shown employed between the single pair of oppositely facing plates.

It could be advantageous for some applications to deliberately design the several dielectrics such that their distinct materials are present in different amounts and/or with different dimensions. Consider an example relative to FIG. 3d. The electrostatic field determining the displacement current between plates 1a and 2a might be uniform between these two plates, which might imply that both layers of material between these plates might equally influence a changing electrostatic field between these plates. However, the electromagnetic wave propagating along plate 1a from terminal 13, filling plate 1a with charge, might be more influenced by the nearer dielectric layer 3 than by the farther dielectric layer 4. Thus, the material of the nearer dielectric layer 3 would more predominantly impose its signature pattern coloration corruption upon the charging of plate 1a than the material of the farther dielectric layer 4. This predominance could be offset by making dielectric 3 thinner than dielectric 4. Dielectric 3 may be closer to plate 1a than dielectric 4, but there is more quantity of dielectric 4 to affect the electromagnetic wave's field around plate 1a, so the two effects could offset each other, resulting in a balanced influence of the two materials upon plate 1a. If one desires to provide a balanced influence in this manner, but for both plate 1a and plate 2a simultaneously, it might be advantageous to change to a different configuration, such as taught for FIG. 4a below. FIGS. 3a–3d show each of the plural dielectrics, comprising a distinct material, as having a defined structural shape, and being disposed adjacent to at least one other dielectric, in at least one instance per capacitor. As shown in FIGS. 3a–3d, these plural dielectrics comprising distinct materials are adjacent, but they are not interspersed. That is, one dielectric comprising a first material is exclusively closer to a given electrode plate than another adjacent dielectric comprising a distinct second material, such that all portions of the first material are closer to the plate than any portion of the second material, and no portion of the second material is closer to the plate than any portion of the first material. For example, in FIG. 3a dielectrics 3 and 4 are not interspersed relative to plate 1a, because dielectric 3 is exclusively closer to plate 1a than dielectric 4 is.

It is also possible, in accordance with the present invention, for at least one dielectric comprising one material to be interspersed among another dielectric comprising a distinct material, relative to a given plate or plate subarea. This is shown in FIGS. 4a–4g. A first dielectric comprising a first material is interspersed among a second dielectric comprising a second distinct material if some portion of the first material is closer to the plate than some portion of the second material, and some portion of the second material is closer to the plate than some portion of the first material.

Figure 4A:
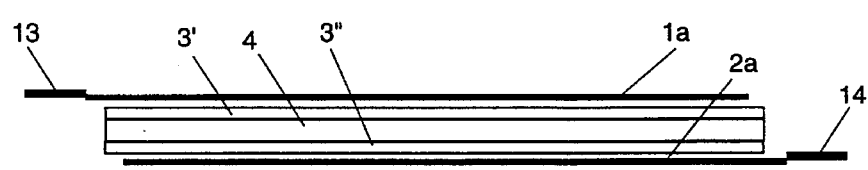
FIGS. 4a–4g show a capacitor in elevation view, illustrating possible embodiments of the present invention employing interspersed dielectrics comprising distinct materials in the space or spaces between oppositely facing plate pairs.

Interspersed plural dielectrics comprising distinct materials can be advantageous for some applications over non-interspersed plural dielectrics comprising distinct materials. For example, with non-interspersed plural dielectrics, a first material that is exclusively closer to a given plate could have a predominant coloration influence on an electromagnetic wave of very short wavelengths (perhaps representing a very high frequency signal) travelling along that plate, predominating over the coloration influence of a second distinct material that is exclusively farther from this plate. Thus the second distinct material would not have sufficient influence to adequately ameliorate or complement the signature pattern coloration corruption by the first material. In contrast, if these two dielectrics with their distinct materials were interspersed, then one material would not unduly predominate over the other, and each material could effectively ameliorate or complement the signature pattern coloration corruption by the other material. FIG. 4a shows, in elevation view, another possible embodiment of a basic capacitor constructed in accordance with the present invention. The structure shown in FIG. 4a is similar to the structure shown in FIG. 3d. The difference is that plural dielectrics 3 and 4 are interspersed relative to plate 1a (and also relative to plate 2a). FIG. 4a shows a dielectric 3' adjacent to plate 1a and a dielectric 3" adjacent to plate 2a. Dielectrics 3' and 3" are both instances of dielectric 3, and both comprise a first material that is the same material. Dielectric 4 comprises a second material distinct from the first material that dielectric 3 comprises. Some portion of the first material (in dielectric 3') is closer to plate 1a than some portion of the second material (in dielectric 4), and some portion of the second material (in dielectric 4) is closer to plate 1a than some portion of the first material. Thus the two dielectrics 3 and 4 are interspersed. They are interspersed relative to plate 1a, and also relative to plate 2a.

It can be appreciated that an electromagnetic wave travelling along plate 1a could advantageously be made to be influenced substantially equally by the distinct first and second materials, and likewise for plate 2a, especially if the various thicknesses of the instances of dielectrics 3 and 4 are made appropriate for the wavelength of the electromagnetic wave representing a signal being processed by the capacitor. The several layers could have the same thickness as one another, or be of various different thicknesses. It could be advantageous for the layer closer to a plate to be thinner than a layer farther from that plate; for example, the material closer to the plate might have more influence due to its proximity, so it might be advantageous to provide less quantity of this material via a thinner layer, compared to the layer of distinct material that is farther from the plate. FIG. 4a shows a total of three layers of plural dielectrics between oppositely facing plates; it could be further advantageous to provide more than three layers.

In discussing non-interspersed plural dielectrics in conjunction with FIG. 3d, it was described how deliberately employing unequal thicknesses of dielectric 3 vs. 4 could advantageously provide equal influence of both dielectric materials upon the electromagnetic wave's field around plate 1a, but it would be difficult to simultaneously provide equal influence of both dielectric materials upon plate 2a. Interspersed plural dielectrics could advantageously solve this latter problem, as a discussion of FIG. 4a can demonstrate. For example, dielectric 3' could be made thinner than dielectric 4, so that the two dielectric materials could have equal influence upon plate 1a, the nearer proximity of dielectric 3' to plate 1a being offset by the greater quantity of dielectric 4 in the vicinity of plate 1a, as discussed above. Likewise, and simultaneously, dielectric 3" could be made thinner than dielectric 4, so that the two dielectric materials could have equal influence upon plate 2a, the nearer proximity of dielectric 3" to plate 2a being offset by the greater quantity of dielectric 4 in the vicinity of plate 2a, as discussed above. Thus, interspersed plural dielectrics can allow simultaneous optimization for both (or all) plates surrounding the interspersed plural dielectrics. With interspersed plural dielectrics, this optimization could be provided for a narrow range of frequencies, or for a broad range of frequencies.

Figure 4B:
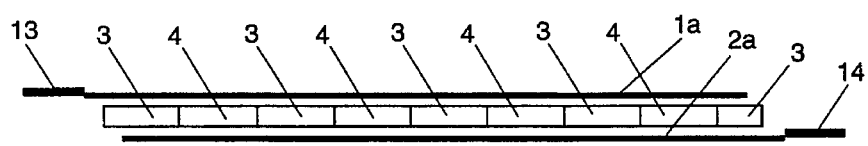

As another example, suppose that the material of farther dielectric 4 is generally desirable as a coloration complement to the material of nearer dielectric 3' or 3", but that it has a severe resonant peak in its dielectric constant at a certain very high frequency, and that it could be advantageous to prevent this peak from imposing its coloration upon the electromagnetic wave's field around plate 1a or plate 2a. The thickness of each dielectric 3' and 3" could then be advantageously deliberately designed to be thick enough so that, at the very high frequency of the dielectric 4 material's resonant peak, the electromagnetic wavelength is short enough compared to this thickness so that dielectric 4 has reduced influence upon plate 1a or plate 2a. Meanwhile, at lower frequencies, where the material of dielectric 4 is well behaved and has a beneficial ameliorating or complementary influence to the material of dielectric 3' and 3", the longer wavelength of these lower frequencies, compared to the deliberately designed thickness of dielectric 3' or 3", could allow the material of dielectric 4 to influence plate 1a and plate 2a. Thus, the thickness of dielectric 3' and of dielectric 3" could be deliberately designed to be thick enough to reduce dielectric 4's influence at very high frequencies, yet thin enough to allow dielectric 4's influence at lower frequencies. This example illustrates one of many ways that plural dielectrics could be skillfully employed to advantageously ameliorate or complement each other's signature pattern colorations. It also illustrates how they could be skillfully employed to advantageously do so at one frequency or various frequencies or over a range of frequencies. FIG. 4b shows, in elevation view, another possible embodiment of a basic capacitor constructed in accordance with the present invention. The structure shown in FIG. 4b is similar to the structure shown in FIG. 4a, and represents another example of interspersed plural dielectrics. In FIG. 4b, dielectrics 3 and 4 both have portions adjacent to plate 1a, which was not the case in FIG. 4a. In FIG. 4b, dielectrics 3 and 4 are shown as having rectangular shapes, but they could have any shapes, any dimensions, and any locations. The shapes, dimensions, and locations of interspersed dielectrics 3 and 4 could be critically optimized for best performance in various applications. The FIG. 4b configuration could be advantageous over the FIG. 4a configuration for some applications; for example, it might be less sensitive to being optimized for a particular electromagnetic wavelength, and therefore might be more suitable to a capacitor designed to handle various frequencies. Dielectric 3 or 4 could comprise a gaseous material or voids. If the dielectric strength or breakdown voltage of a dielectric between plates is reduced by employing plural materials in accordance with the present invention, the thickness of the dielectric between plates could be increased to compensate, or the capacitor voltage rating could be lowered.

Figure 4C:

FIG. 4c shows, in elevation view, another possible embodiment of a basic capacitor constructed in accordance with the present invention. The structure shown in FIG. 4c is similar to the structure shown in FIG. 4b, and represents another example of interspersed plural dielectrics. In FIG. 4c, a dielectric 5 (shown as black dots) is interspersed amongst dielectric 3, and thus does not necessarily have a defined structural shape. Dielectric 5 as shown in FIG. 4c comprises a material distinct from the material which dielectric 3 comprises. For example, dielectric 3 could comprise a solid material and dielectric 5 could comprise a distinct solid material, or a gaseous material, or voids in dielectric 3. Dielectric 3 and dielectric 5 could be interspersed randomly, or in a structured manner.

The FIG. 4c configuration could be advantageous over the FIG. 4a and FIG. 4b configurations for some applications; for example, it might be even less sensitive to being optimized for a particular electromagnetic wavelength, and therefore might be more suitable to a capacitor designed to handle various frequencies. The FIG. 4c configuration might offer the maximum and smoothest blending of two distinct materials, and thus might be able to provide the smoothest blending of the different signature pattern colorations of the two distinct materials. Also, the FIG. 4c configuration offers a convenient structure for incorporating a superior dielectric material such as a gas (including possibly air) or voids among a distinct dielectric material such as a plastic.

The size of each clump of dielectric 3 or 5 could be large, or it could be small. As the art recognizes, and as the drawings show (e.g. FIGS. 4a,4b,4c), clumps of distinct materials imply that the distinct materials are substantially separately congregated at distinct locations. As discussed above, a material's response to an electric field depends on the nature of its molecule type and molecular arrangement. Therefore each distinct material can retain its own distinct signature pattern, of response and temporal lag to an electric field, when like molecule types and like molecular arrangements are congregated at one location. As discussed above, the objects and advantages taught by the present invention can be realized when a plurality of such distinct materials are employed in a capacitor dielectric, each distinct material being separately congregated at distinct locations, so that a plurality of distinct signature patterns are present. The two dielectrics 3 and 5 comprising distinct materials could comprise different types or shapes or structures (i.e. arrangements) of molecules, appropriately separately congregated at distinct locations.

Figure 4D:
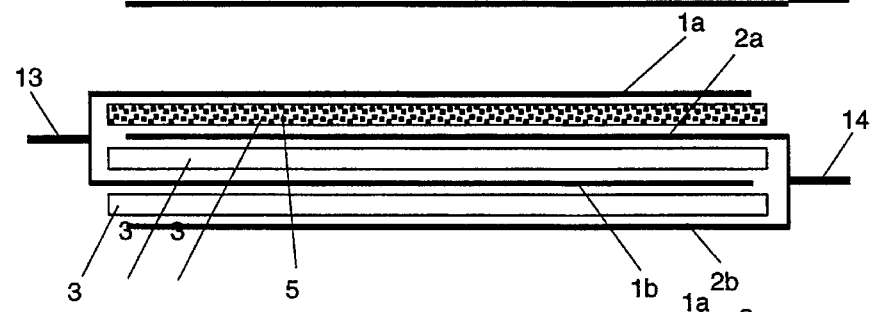

FIG. 4d shows, in elevation view, another possible embodiment of a basic multiple plate capacitor constructed in accordance with the present invention. The structure shown in FIG. 4d is similar to the structure shown in FIG. 3a. The difference shown is that dielectric 5 is interspersed among dielectric 3 in the FIG. 4d configuration, these two dielectrics comprising distinct materials, while in the FIG. 3a configuration dielectric 4 is merely adjacent to dielectric 3, these two dielectrics comprising distinct materials.

In the FIG. 4d configuration, there are plural dielectric materials between one pair of oppositely facing, distinctly electrically connected plates, e.g. plates 1a and 2a. Thus, between at least one pair of oppositely facing plates in a capacitor, there are plural distinct dielectric materials.

This is a sufficient condition to satisfy the requirements of the present invention, so in principle any dielectrics may be employed between any and all other pairs of oppositely facing plates in one capacitor.

The dielectrics separating plate 2a from plate 1b, and separating plate 1b from plate 2b, are shown in FIG. 4d as being instances of dielectric 3, comprising the same material as employed in dielectric 3 participating in the separation of plate 1a from plate 2a. But these dielectrics could each variously or all be instances of either dielectric 3 or dielectric 5, comprising the same material as employed in the instance of dielectric 3 or 5 separating plate 1a from plate 2a. Alternatively, the dielectrics separating plate 2a from plate 1b, and separating plate 1b from plate 2b, could each variously or all be instances of dielectrics comprising materials distinct from the materials in the instance of dielectric 3 and dielectric 5 separating plate 1a from plate 2a.

Figure 4E:
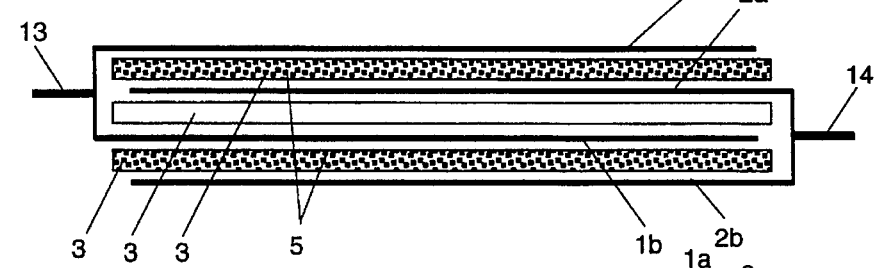

FIG. 4e illustrates a possible embodiment where the dielectric employed between some oppositely facing, distinctly electrically connected plates comprises the same material as a material employed in either dielectric 3 or dielectric 5. FIG. 4e shows dielectric 3 separating plate 2a from plate 1b, comprising the same material as employed in dielectric 3 participating in the separation of plate 1a from plate 2a.

Figure 4F:
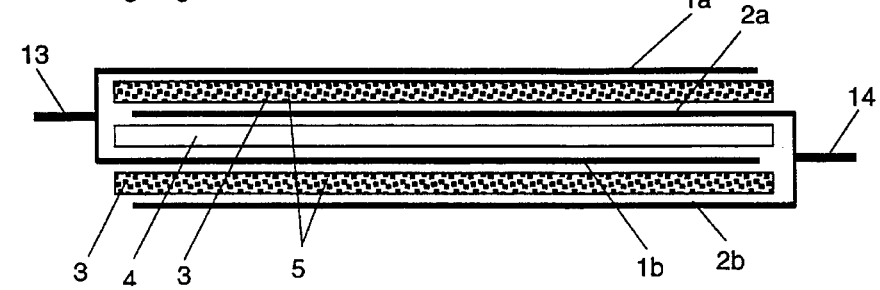

FIG. 4f illustrates a possible embodiment where the dielectric employed between some oppositely facing, distinctly electrically connected plates comprises a material distinct from the material employed in either dielectric 3 or dielectric 5. FIG. 4f shows dielectric 4 separating plate 2a from plate 1b, where dielectric 4 comprises a material distinct from the material which dielectric 3 comprises and distinct from the material which dielectric 5 comprises.

Figure 4G:
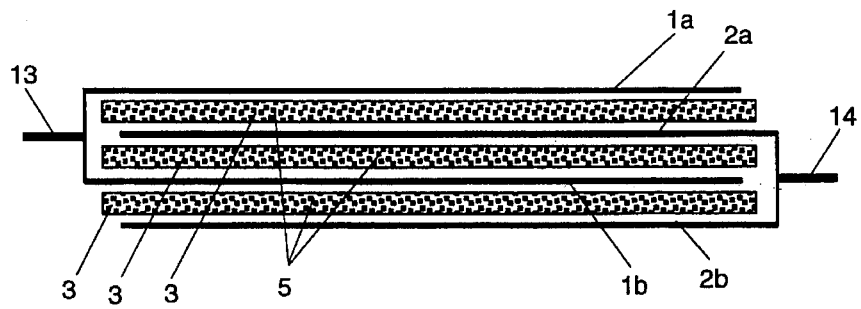

FIG. 4g illustrates a possible embodiment where a combination interspersed dielectric could be employed between all plates in a capacitor.

In all embodiments of the present invention, it is understood that each single dielectric shown, such as dielectric 3 or 4 or 5, may comprise one material or may comprise plural materials. Thus, for example, in FIG. 4g dielectric 3 might comprise plural solid materials, and dielectric 5 might comprise a gas or voids in dielectric 3. If any one dielectric, such as dielectric 3 or 4 or 5 as shown, were to comprise two or more distinct materials, then the requirements of the present invention would already be met thereby.

In accordance with the present invention, there could be plural distinct materials between some pairs of oppositely facing plates and a single material between other pairs. There could be differing proportional combinations of plural distinct materials at various locations within one capacitor.

It is noted that prior art capacitors have employed a single solid material as a dielectric between oppositely facing electrode plates. If a second solid material is also disposed between oppositely facing plates of a capacitor, then the presence of this second material is structurally distinguishable over its absence (where the first material alone would be situated between oppositely facing plates), and the presence of this second material is also electrically distinguishable over its absence, whereby the electrical signature or performance of the capacitor's dielectric is different compared to that for a dielectric comprising the first material alone. Likewise, if a second type of molecule is also disposed between oppositely facing plates of a capacitor, differing from the first type of molecule which the first material comprises, then the presence of this second type of molecule is structurally and electrically distinguishable over its absence. Likewise, if a volume or volumes of a gas are also disposed between oppositely facing plates of a capacitor, in addition to the first material, then the presence of the void spaces and of the gas molecules within each void space is structurally and electrically distinguishable over their absence. Likewise, if a volume or volumes of voids without gas molecules are also disposed between oppositely facing plates of a capacitor, in addition to the first material, then the presence of the void spaces is structurally and electrically distinguishable over their absence.

For purposes of the present invention, a substantial vacuum occupying a cavity between oppositely facing plates shall be deemed to be a second distinct material from any solid material between oppositely facing plates of the same capacitor—in the same way that a gas would be, since a gas comprises a void sparsely populated with freely moving molecules. A solid material with cavities containing a vacuum is structurally distinguishable over the same solid material without cavities containing a vacuum, and its electrical signature pattern would be distinguishable as well.

The various possible embodiments shown above have various structural features that distinguish over prior art. These various structural features could be variously combined, to produce yet further possible embodiments of the present invention. For example, features of the FIG. 4a embodiment could be combined with features of the FIG. 4c embodiment, so that for example a layer of interspersed plural dielectric materials, such as shown in FIG. 4c, could be disposed as one of plural layers, for example as the central layer of FIG. 4a.

A dielectric or dielectrics comprising an appropriate plurality of materials could also advantageously be employed in other portions of a capacitor also affected by and/or affecting an electric field associated with the capacitor. For example, any material in the volume of space immediately outside the plate array is still affected by and affects the electromagnetic wave's field of a current, voltage, or signal propagating along the outermost plates; the outer dielectric wrap or case of the capacitor is located here, and thus a capacitor performance improvement could be realized by appropriately making the capacitor's dielectric outer wrap or case from appropriate plural materials. For purposes of the present invention, a means for attaching a dielectric outer wrap is not regarded as a separate, distinct dielectric. Thus, for example, adhesive backing on a polyester tape outer wrap does not count as a separate, distinct dielectric material from the polyester. Likewise, for purposes of the present invention, any coloring pigment dispersed in the polyester does not count as a separate, distinct dielectric material from the polyester.

The use of interspersed plural dielectrics, comprising distinct materials, was taught above for the spaces between oppositely facing plates within a capacitor, in conjunction with FIGS. 4a–4g. This same teaching can be advantageously applied to that part of a capacitor comprising the space outside oppositely facing plates, or outside the plate array. Prior art has not employed interspersed plural dielectrics, comprising distinct materials, anywhere in capacitors, either in the space between oppositely facing plates or outside this space.

Figure 5A:
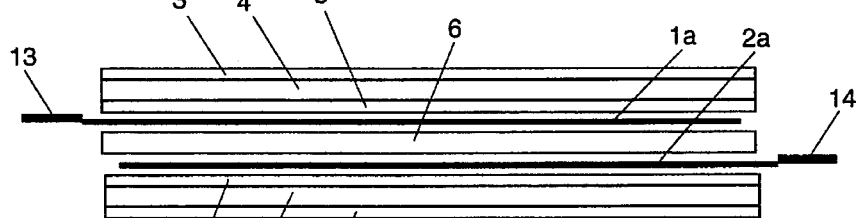
FIGS. 5a–5f show a capacitor in elevation view, illustrating possible embodiments of the present invention employing interspersed dielectrics comprising distinct materials outside the space or spaces between oppositely facing plate pairs.
Figure 5B:
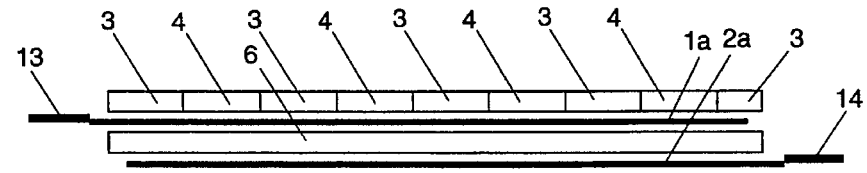
Figure 5C:
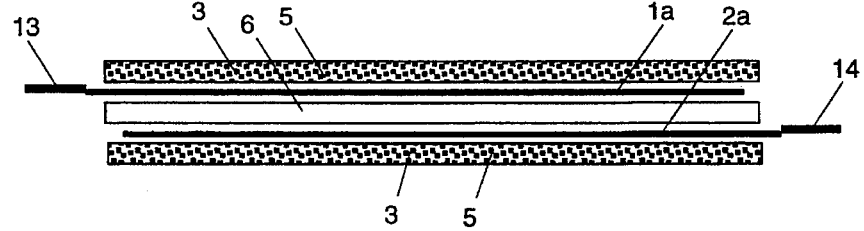
Figure 5D:
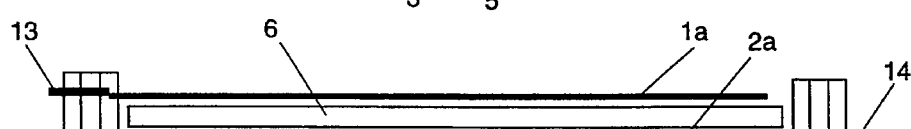
Figure 5E:
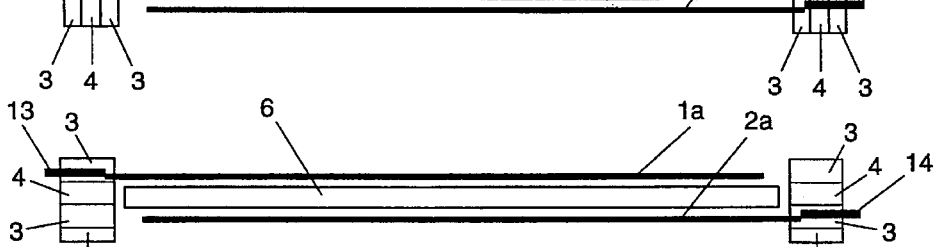
Figure 5F:
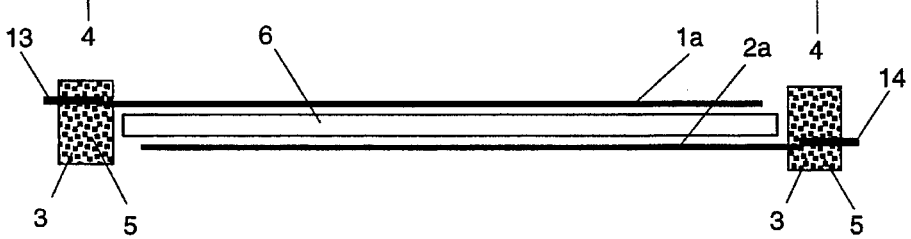

FIGS. 5a–5f show, in elevation view, possible embodiments of a capacitor constructed in accordance with the present invention, where interspersed plural dielectrics are employed outside the plate array. FIGS. 5a–5c echo the configurations of interspersed plural dielectrics shown in FIGS. 4a–4c, respectively, but applied outside the plate array and adjacent to the outermost plate or plates. FIGS. 5d–5f also echo the configurations of interspersed plural dielectrics shown in FIGS. 4a–4c, respectively, but applied outside the plate array and not adjacent to the outermost plate or plates, such as for example at the ends of the capacitor as shown. For simplicity, a single dielectric 6 is shown separating plates within the capacitor array.

The structural features shown in FIGS. 5a–5c could be variously combined with the various features shown in FIGS. 5d–5f, and either or both of these could be variously combined with the features shown in FIGS. 2a–4g. Thus, the teachings of the present invention could be advantageously employed in a capacitor within the space between oppositely facing plates, or outside this space, or both.

Any definitions or criteria given in this specification are possible illustrative examples, contributing to the description of some possible embodiments of the present invention. These definitions and criteria do not delimit the present invention, either inclusively or exclusively.

Although the present invention has been described in considerable detail in the above specification, it is not intended that the invention be limited to such detail except as necessitated by the appended claims or their legal equivalent.

I claim:

1. A method for ameliorating the temporal lag pattern, in response to an electrical field, of a single material employed as a dielectric in a capacitor, said method comprising the step of providing a plurality of oppositely facing, distinctly electrically connected electrodes, and a step selected from the group consisting of:

the step of providing a first dielectric or dielectrics between said plurality of oppositely facing electrodes, wherein said first dielectric or dielectrics comprise a plurality of distinct materials, whereby said distinct materials are substantially separately congregated at distinct locations, and the step of providing a second dielectric or dielectrics disposed outside the space or spaces between said oppositely facing, distinctly electrically connected electrodes, wherein said second dielectric or dielectrics comprise an interspersed plurality of distinct materials, whereby said distinct materials are substantially separately congregated at distinct locations.

2. The method of claim 1 wherein a first material of said plurality of distinct materials or of said interspersed plurality of distinct materials is a plastic.

3. The method of claim 1 wherein a second material of said plurality of distinct materials or of said interspersed plurality of distinct materials is selected from a group consisting of a plastic and a gas and a vacuum.

4. A capacitor comprising, a plurality of oppositely facing, distinctly electrically connected electrodes, a dielectric or dielectrics disposed between said oppositely facing, distinctly electrically connected electrodes, said dielectric or dielectrics comprising a plurality of distinct materials, whereby said distinct materials are substantially separately congregated at distinct locations, where at least one first material of said plurality of distinct materials is a plastic, and at least one second material of said plurality of distinct materials is selected from the group consisting of a plastic and a gas and a vacuum.

5. The capacitor of claim 4 wherein the only types of materials constituting said dielectric or dielectrics are selected from a group consisting of a plastic and a gas and a vacuum.

6. A capacitor comprising, a plurality of oppositely facing, distinctly electrically connected electrodes, a first dielectric or dielectrics disposed between said oppositely facing, distinctly electrically connected electrodes, a second dielectric or dielectrics disposed outside the space or spaces between said oppositely facing, distinctly electrically connected electrodes, said second dielectric or dielectrics comprising an interspersed plurality of distinct materials, whereby said distinct materials are substantially separately congregated at distinct locations.

7. The capacitor of claim 6 wherein a first material of said interspersed plurality of distinct materials is a plastic.

8. The capacitor of claim 6 wherein a second material of said interspersed plurality of distinct materials is selected from a group consisting of a plastic and a gas and a vacuum.

* * * * *